United States Patent [19]

Hulicsko

[11] Patent Number: 5,054,152
[45] Date of Patent: Oct. 8, 1991

[54] MECHANICAL STREET SWEEPER
[75] Inventor: Leslie Hulicsko, Regina, Canada
[73] Assignee: Sweeprite Manufacturing Inc., Regina, Canada
[21] Appl. No.: 373,464
[22] Filed: Jun. 30, 1989
[51] Int. Cl.[5] .................................... E01H 1/04
[52] U.S. Cl. ................................. 15/84; 280/716
[58] Field of Search ........................ 15/82–86, 15/340.3, 340.4; 280/711, 712, 716, 717, 724

[56] References Cited
U.S. PATENT DOCUMENTS

| | | |
|---|---|---|
| 3,051,468 | 8/1962 | Lenet . |
| 3,305,230 | 2/1967 | Musser . |
| 3,966,223 | 6/1976 | Carr ................................. 280/712 |
| 4,171,551 | 10/1979 | Hildebrand . |
| 4,236,756 | 12/1980 | Hildebrand et al. ............... 15/84 X |
| 4,310,171 | 1/1982 | Merkle .............................. 280/716 |
| 4,580,798 | 4/1986 | Roelofs . |
| 4,580,809 | 4/1986 | Leaf ................................... 280/712 |
| 4,608,725 | 9/1986 | Jackson ................................. 15/84 |
| 4,643,447 | 2/1987 | Rogers . |

Primary Examiner—Edward L. Roberts
Attorney, Agent, or Firm—Barrigar & Oyen

[57] ABSTRACT

A self-propelled mechanical street sweeper comprising a production truck cab and chassis, the frame beams of which have been modified by removing rear portions thereof extending behind the rear axle. The sweeper comprises side brushes, a pick-up brush and a conveyor. The conveyor is mounted forwardly of the pick-up brush adjacent the rear axle of the chassis, and has a uniform width throughout its length, which width is substantially the same as the width of the pick-up brush. The street sweeper of the present invention also comprises a rear suspension mounted above and forwardly but not rearwardly of the rear axle, comprising a rubber pad mounted between the frame beams and the rear axle for biasing the rear axle away from the chassis, and a connecting arm pivotally mounted to the frame beams at a location forwardly of the rear axle for connecting the rear axle to the frame beams.

11 Claims, 2 Drawing Sheets

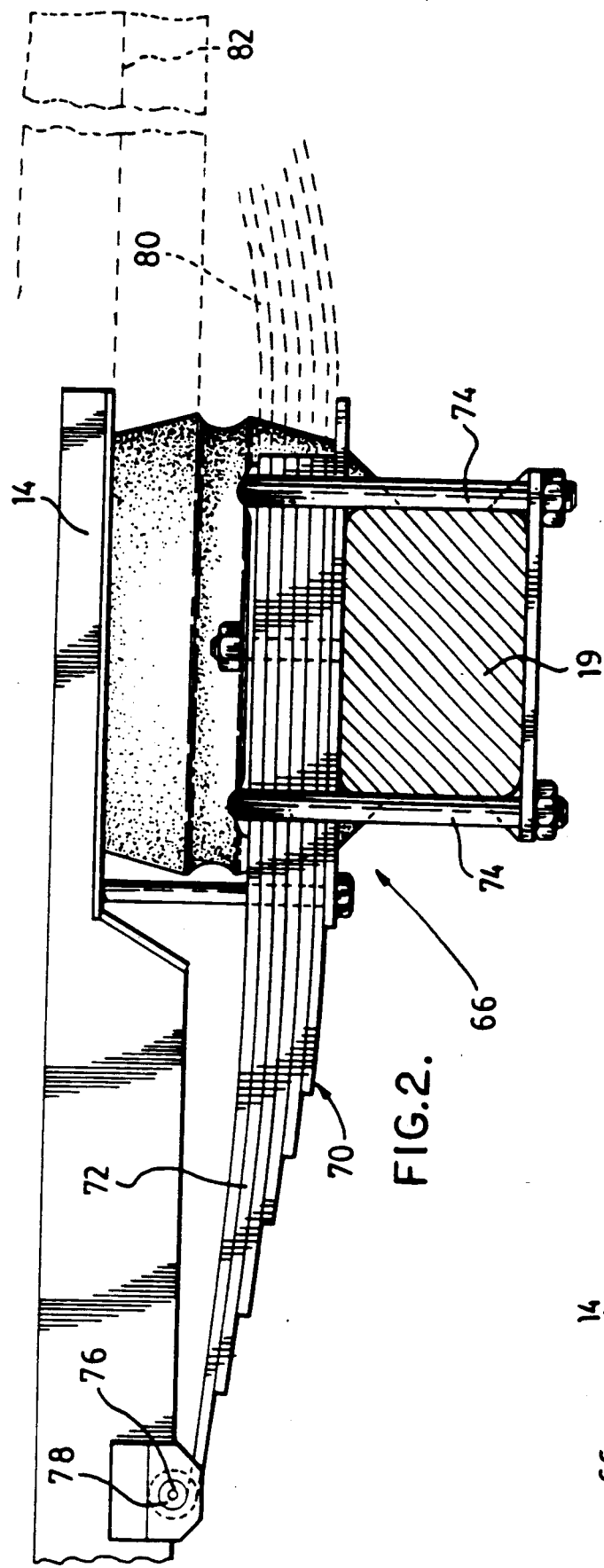
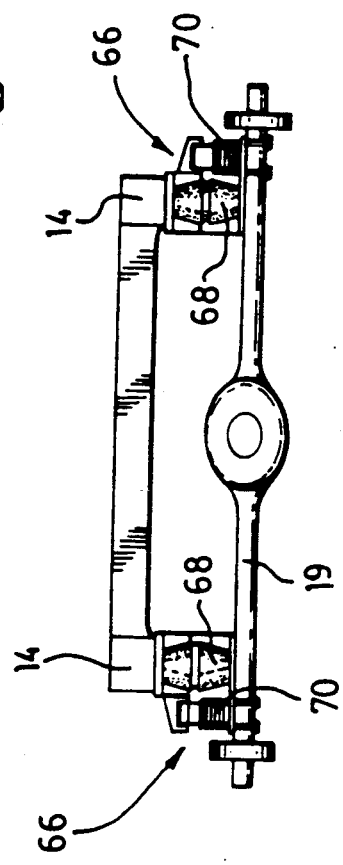
FIG.2.
FIG.3.

MECHANICAL STREET SWEEPER

FIELD OF THE INVENTION

This invention relates to self-propelled mechanical street sweepers utilizing brushes and a mechanical elevator for conveying debris into a hopper.

BACKGROUND OF THE INVENTION

A typical self-propelled mechanical street sweeper comprises a cab and a chassis having a sweeper mechanism mounted thereon. The sweeper mechanism generally comprises a pick-up brush mounted at the rear of the chassis a pair of gutter brooms suspended from the sides of the chassis for sweeping debris towards the pick-up brush, a conveyor or elevator for conveying the debris up and away from the pick-up brush, a hopper for storing the debris, and a mechanism for dumping the hopper.

It has been found that unless the pick-up brush is mounted reasonably close to the rear wheels of the sweeper chassis, some of the debris swept towards the pick-up brush by the gutter brushes is left behind on the road as the sweeper turns corners. The reason for this problem is that the swath of the rear pick up brush is not in complete conformity with the path of the vehicle, as the vehicle negotiates corners. This problem can be overcome by mounting the elevator between the rear wheels of the sweeper, and the pick-up brush right behind the rear wheels. However, standard production truck chassis tend to have a through rear axle. Therefore in order to provide sufficient clearance for the elevator, most prior art sweepers are mounted on a custom-made chassis having a pair of stub rear axles. Custom chassis are, however, expensive to build in small volumes. Additionally, most custom chassis sweepers are built for slow speed use only, because of the difficulties associated with certifying a custom chassis for highway speed. As a result, driving such sweepers long distances between jobs tends to be a slow and uncomfortable process.

Attempts have been made in the past to create a sweeper which can be mounted on an OEM or production truck chassis, so as to avoid the need to design and manufacture a custom chassis. One such prior art design includes a trailer for housing the rear pick-up brush which is pulled on casters behind the truck chassis, a reduced-width elevator which fits in between the frame of the chassis, and an auger mechanism for channelling the dirt swept up by the rear brush into the reduced-width elevator. However, because the pick-up brush of this prior art design protrudes too far to the rear, there exists a disconformity between the swath of the sweeper and the path of the vehicle as it turns a corner, resulting in less effective sweeping action than sweepers utilizing custom truck chassis. Also, in the case of this prior art design, there exists the risk that its pick-up brush trailer could be damaged by impact against a curb as the sweeper turns a corner.

SUMMARY OF THE INVENTION

The present invention provides a mechanical sweeper design, utilizing a modified production truck chassis, which overcomes the disadvantages of the prior art. The street sweeper made in accordance with present invention produces sweeping action comparable to that of a sweeper utilizing a custom chassis. However, because the subject sweeper utilizes a production truck chassis, it is less costly to build yet is capable of cruising comfortably at highway speeds.

The street sweeper of the subject invention utilizes a production truck cab and chassis having a pair of longitudinally extending frame beams, a through rear axle extending transversely thereto, and a pair of rear wheels mounted to the ends of the rear axle, wherein the frame beams have been modified by removing rear portions thereof extending behind the rear axle. The sweeper includes side brush means mounted to the chassis forward of the rear wheels and rotatable about a near vertical axis for gathering debris from the sides of the path of travel of the sweeper and directing it inwardly to create a windrow of debris underneath the sweeper along the longitudinal axis thereof, pick-up brush means mounted behind the rear wheels and rotatable about a horizontal axis for picking up the windrow of debris, conveying means mounted forwardly of the pick-up brush means adjacent the rear axle for conveying upwardly the debris picked up by the pick-up brush means, hopper means mounted forward of the conveyor means for receiving and storing the debris conveyed thereby, dumping means for dumping the hopper, and rear suspension means. The conveying means has a uniform width throughout its length, and is approximately the same width as the pick-up brush. The rear suspension means is mounted above and forwardly but not rearwardly of the rear axle. The rear suspension means comprises bias means mounted between the frame and the rear axle for biasing the rear axle away from the frame of the chassis, and connecting arm means pivotally mounted to the frame at a location in front of the rear axle for connecting the rear axle to the frame beams.

The bias means is preferably a rubber pad mounted between the rear axle and the frame, which acts as both a spring and a shock absorber. The connecting arm preferably functions as both a trailing arm and a torsion bar. In a preferred embodiment, the connecting arm consists of the forward portion of the leaf spring supplied with the production truck chassis.

BRIEF DESCRIPTION OF THE DRAWINGS

The invention will now be described, by way example only, with reference to the accompanying drawings, in which like numerals refer to like parts, and in which:

FIG. 2 is a side elevational view of the rear suspension means of the present invention., and FIG. 3 is a partial elevational rear view illustrating the frame, rear suspension means, and rear axle of a street sweeper embodying the subject invention.

DETAILED DESCRIPTION OF THE PREFERRED EMBODIMENT

Figure 1:
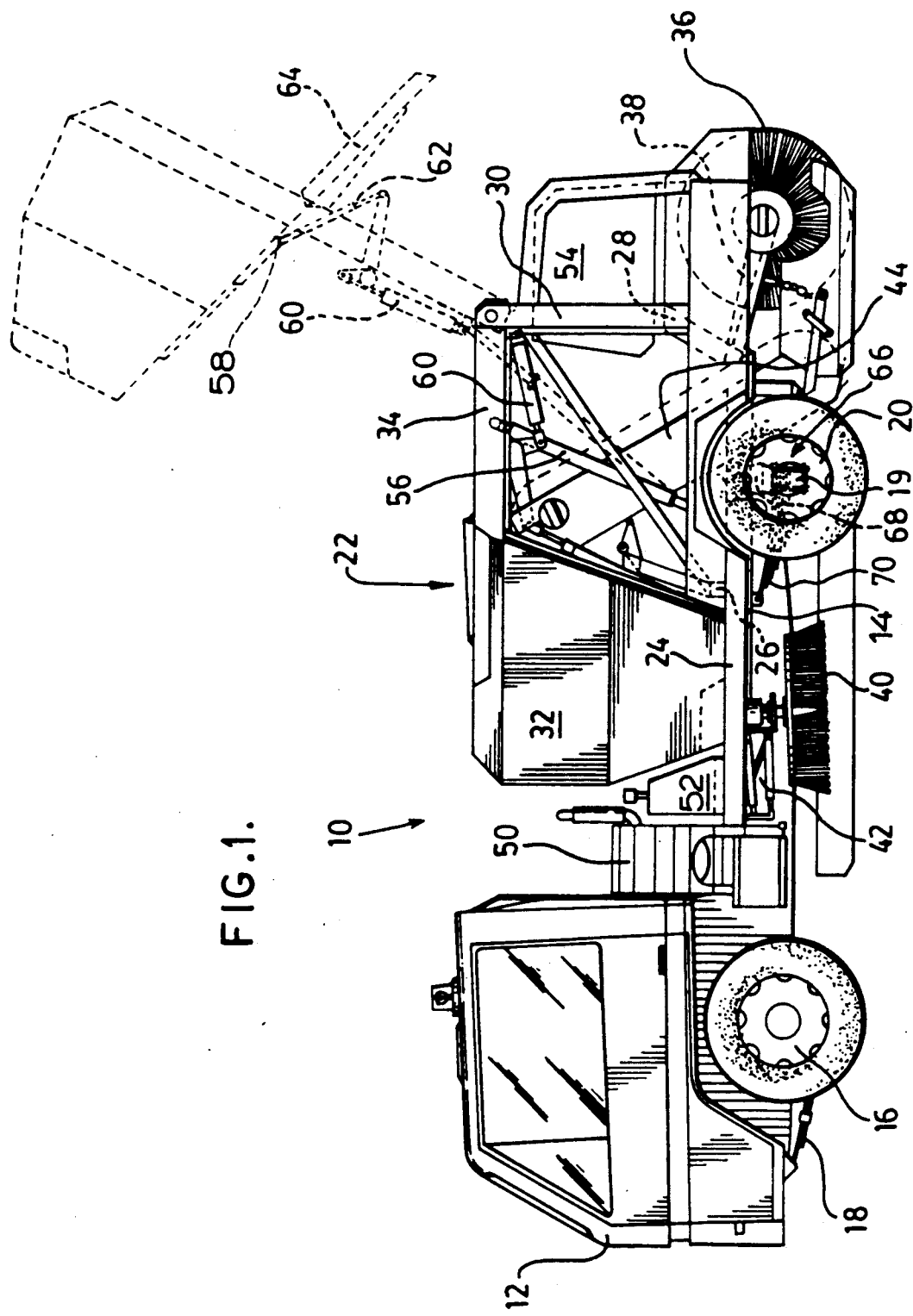
FIG. 1 is a side elevational view of a street sweeper embodying the subject invention.

FIG. 1 illustrates a street sweeper 10 embodying the subject invention. Street sweeper 10 utilizes a production truck chassis comprising a cab 12, chassis frame 14, front wheels 16, front suspension 18, engine and drive train (not shown), rear axle 19 and rear wheels 20. Those portions of the chassis frame 14 extending rearwardly of the rear axle 19 have been removed.

Mounted unto production truck frame 14 is a custom sweeper mechanism shown generally as 22 which consists of a number of components mounted unto a sweeper frame which is welded, bolted or otherwise fastened to chassis frame 14 The sweeper frame comprises longitudinal frame members 24, cross bar 26, angular frame member 28 and rear upright member 30.

Dirt hopper 32 is pivotally coupled to frame upright 30 by means of a pair of spaced lift arm 34. Pick-up brush 36 is mounted behind rear wheels 20 by mounting means 38. Gutter brushes 40 are suspended from chassis frame 14 or sweeper longitudinal frame members 24 by brush suspension means 42.

Elevator 44 is mounted between pick-up brush 36 and rear axle 19 and extends at an angle between the front of pick-up brush 36 and the back of dirt hopper 32. The rear panel of dirt hopper 32 is provided with an opening which permits the elevator 44 to direct dirt and other debris into dirt hopper 32. Elevator 44 has a uniform width throughout its length, which width is substantially the same as the width of pick up brush 36. Elevator 44 comprises a chute or pan against which squeegees mounted on a pair of squeegee carriers or straps slide so as to move the debris upwardly in the chute as the squeegees are moved upwardly.

Means (not shown) are provided for lowering gutter brushes 40, pick-up brush 36 and elevator 44 into sweeping mode and for raising such components into transport mode. Hydraulic pump (not shown) powered by auxiliary engine 50, drives hydraulic motors (not shown) which turn gutter brushes 40, pick-up brush 36, and elevator 44. Hydraulic oil tank 52 supplies hydraulic oil to hydraulic pump 48. Water tank 54 is located at the rear above pick-up brush 36.

Dirt hopper 32 is dumped rearwardly by operation of a pair of hydraulic cylinders 56, which extend between the sweeper frame and lift arm 34. The solid lines illustrate dirt hopper 32 and lift arms 34 in their rest position, and the broken lines illustrate dirt hopper 32 and lift arms 34 in their dump position. As dirt hopper 32 is dumped, a gate mechanism comprising hopper gate 58, hydraulic cylinders 60 and linkage 62 function to close gate 58 over the opening in the rear of dirt hopper 32 as it is elevated upwardly and rearwardly. As dirt hopper 32 swings past top dead center, hopper cover 64 slides open, allowing the debris in dirt hopper 32 to slide out into a suitable waste receptacle.

The sweeper of the present invention also comprises rear suspension means shown generally as 66, comprising bias means for biasing the rear axle away from the chassis, preferably in the form of a pair of rubber pads 68 which are mounted above rear axle 19 directly below longitudinal chassis frame members 14, and connecting means 70 for connecting the rear axle to the chassis.

Referring now to FIGS. 2 and 3, depicting a preferred embodiment of rear suspension means 66, connecting means 70 may comprise the forward portion of a conventional leaf spring 72 coupled to rear axle 19 by means of U-bolts 74 and pivotally coupled to a forward portion of longitudinal frame member 14 by pins 70 surrounded by grommet 78. Modified leaf spring 72 no longer functions as a spring, but rather, it functions as both a trailing arm and a torsion bar. Rubber pads 68 preferably take the form of Timbren (trade mark) or other suitable commercially available rubber suspension cushions. As shown in the dotted lines, the rear portion 80 of leaf spring 72 and rear portion 82 of chassis frame 14 have been removed, in order to provide clearance for full-width elevator 44.

The modifications made to the production truck chassis in accordance with the present invention produce a sweeper chassis having both a frame and a rear suspension which no longer extends appreciably rearwardly of the rear axle 19. These modifications enable full width elevator 44 to be mounted immediately to the rear of rear axle 19, and pick-up brush 36 to be mounted not too far behind rear axle 19, resulting in reasonably close conformity between the swath of the pick-up brush 36 and the path of the vehicle.

In operation, the sweeper 10 is placed in sweeping mode by lowering the elevator 44, pick-up brush 36 and gutter brushes 40, and activating their hydraulic motors. As the sweeper 10 travels down the road in sweeping mode, the gutter brushes gather dirt and debris from the sides of the path of travel of the vehicle, and direct the dirt inwardly so as to form a row or windrow of dirt in the path of the pick-up brush 36. Pick-up brush 36 sweeps the debris forwardly unto elevator 44. The elevator 44 carries the debris upwardly and discharges it at its uppermost end into dirt hopper 32. When dirt hopper 32 becomes full, it may be dumped rearwardly by activating hydraulic cylinders 56, which elevate lift arms 34 upwardly and rearwardly. As lift arms 34 are elevated, hydraulic cylinders 60 activate hopper gate 58 so as to close the opening in the rear of dirt hopper 32 and thus prevent premature discharge of the hopper contents. As dirt hopper 32 is elevated past top dead center, hopper cover 64 opens, allowing the debris to slide out of dirt hopper 32 into a suitable waste receptacle. Because pick up brush 36 is mounted only a short distance behind rear axle 19, the swath of rear brush 36 is in close conformity with the path of the vehicle, as the sweeper turns corners. As a result, pick-up brush 36 picks up the entire windrow of debris formed by gutter brushes 40, at all times. In order to convert the sweeper 10 into transport mode gutter brushes 40, elevator 44 and rear brush 36 are elevated into their transport position. Because of the operation of rubber pads 08 of rear suspension means 66, the sweeper of the present invention is capable of cruising comfortably at high speeds.

In the preferred embodiment of the invention, the production truck chassis is an Isuzu chassis suitable for carrying a three cubic yard dirt hopper, but other standard OEM production truck chassis may be used, provided that the above-described modifications to the frame and rear suspension are made.

While in the preferred embodiment of the invention the rear suspension means comprises a modified leaf spring and a rubber pad, it should be apparent that the production leaf spring could be removed altogether and replaced by a trailing arm or torsion bar which extends forwardly of but not appreciably behind the rear axle. As well, a coil spring or air bag suspension system could be used instead of a rubber pad, provided that such system does not extend rearwardly of the rear axle.

It should also be understood that while the sweeper illustrated and described above includes a hopper dump mechanism which dumps to the rear, other types of hopper dump systems, such as a side dump system, could be used. Additionally, while FIG. 1 depicts a sweeper having an auxiliary engine which powers the hydraulic pump, it is possible to eliminate the auxiliary engine by coupling the hydraulic pump to a power-take off connected to the camshaft or crankshaft of the vehicle's engine.

It should therefore be apparent to persons skilled in the art that various modifications and adoptions of the structure described above are possible without departing from the spirit of the invention, the scope which is defined in the appended claims.

I claim:

1. A self-propelled mechanical street sweeper, comprising:
   a) a production truck cab and chassis having a pair of longitudinally extending frame beams, a through rear axle extending transversely thereto, and a pair of rear wheels mounted to the ends of the rear axle, wherein the frame beams have been modified by removing rear portions of the frame beams extending behind the rear axle; p1 b) side brush means mounted to the chassis forward of the rear wheels and rotatable about a rear vertical axis for gathering debris from the sides of the path of travel of the sweeper and directing the debris inwardly to create a windrow of debris underneath the sweeper along the longitudinal axis thereof;
   c) pick-up brush means mounted behind the rear wheels and rotatable about a horizontal axis for picking up the windrow of debris;
   d) conveying means mounted forwardly of the pick-up brush means adjacent the rear axle for conveying upwardly the debris picked up by the pick-up brush means, wherein the conveying means has a uniform width throughout its length, which width is substantially the same as the width of the pick-up brush means;
   e) hopper means mounted forwardly of the conveyor means for receiving and storing the debris conveyed thereto by the conveyor means;
   f) dumping means for dumping the hopper means; and
   g) rear suspension means mounted above and forwardly but not rearwardly of the rear axle for smoothing out the ride of the sweeper, wherein the rear suspension means comprises bias means mounted between the frame beams and the rear axle for biasing the rear axle away from the chassis, and connecting arm means pivotally mounted to the frame beams at a location forwardly of the rear axle for connecting the rear axle to the frame beams, wherein the connecting arm means functions as a trailing arm and torsion bar and comprises a modified leaf spring, wherein the modified leaf spring comprises a leaf spring provided with the production truck chassis which has been modified by cutting off the portion thereof which extends behind the rear axle of the chassis.

2. A sweeper as defined in claim 1, wherein the bias means comprises a rubber pad which acts as a spring and shock absorber.

3. A sweeper as defined in claim 1 wherein the dumping means is a rear dumping means comprising a pair of upright support members mounted behind the conveying means at a location near the rear of the chassis means, and a pair of lift arms rigidly attached to the hopper means and pivotally coupled to the support members.

4. A self-propelled mechanical street sweeper, comprising:
   a) a production truck cab and chassis having a pair of longitudinally extending frame beams, a through rear axle extending transversely thereto, and a pair of rear wheels mounted to the ends of the rear axle, wherein the frame beams have been modified by removing rear portions of the frame beams extending behind the rear axle;
   b) side brush means mounted to the chassis forward of the rear wheels and rotatable about a near vertical axis for gathering debris from the sides of the path of travel of the sweeper and directing the debris inwardly to create a windrow of debris underneath the sweeper along the longitudinal axis thereof;
   c) pick-up brush means mounted behind the rear wheels and rotatable about a horizontal axis for picking up the windrow of debris;
   d) conveying means mounted forwardly of the pick-up brush means adjacent the rear axle for conveying upwardly the debris picked up by the pick-up brush means, wherein the conveying means has a uniform width throughout its length, which width is substantially the same as the width of the pick-up brush means;
   e) hopper means mounted forwardly of the conveyor means for receiving and storing the debris conveyed thereto by the conveyor means;
   f) rear dumping means for dumping the hopper means to the rear of the street sweeper; and
   g) rear suspension means mounted above and forwardly but not rearwardly of the rear axle for smoothing out the ride of the sweeper, wherein the rear suspension means comprises bias means mounted between the frame beams and the rear axle for biasing the rear axle away from the chassis, and connecting arm means pivotally mounted to the frame beams at a location forwardly of the rear axle for connecting the rear axle to the frame beams.

5. A street sweeper as defined in claim 4, wherein the rear dumping means comprises a pair of upright members mounted behind the conveying means at a location near the rear of the chassis, and a pair of lift arms rigidly attached to the hopper means and pivotally coupled to the upright members.

6. A sweeper as defined in claim 4, wherein the bias means comprises a rubber pad which acts as a spring and shock absorber.

7. A sweeper as defined in claim 4, wherein the connecting arm means functions as a trailing arm and torsion bar.

8. A sweeper as defined in claim 4, wherein the connecting arm means comprises a modified leaf spring, wherein said modified leaf spring comprises a leaf spring provided with the production truck chassis which has been modified by cutting off the portion thereof which extends behind the rear axle of the chassis.

9. A self-propelled mechanical street sweeper, comprising:
   a) a production truck cab and chassis having a pair of longitudinally extending frame beams, a through rear axle extending transversely thereto, and a pair of rear wheels mounted to the ends of the rear axle, wherein the frame beams have been modified by removing rear portions of the frame beams extending behind the rear axle;
   b) side brush means mounted to the chassis forward of the rear wheels and rotatable about a near vertical axis for gathering debris from the sides of the path of travel of the sweeper and directing the debris inwardly to create a windrow of debris underneath the sweeper along the longitudinal axis thereof;
   c) pick-up brush means mounted behind the rear wheels and rotatable about a horizontal axis for picking up the windrow of debris;

d) conveying means mounted forwardly of the pick-up brush means adjacent the rear axle for conveying upwardly the debris picked up by the pick-up brush means, wherein the conveying means has a uniform width throughout its length, which width is substantially the same as the width of the pick-up brush means;

e) hopper means mounted forwardly of the conveyor means for receiving and storing the debris conveyed thereto by the conveyor means;

f) dumping means for dumping the hopper means; and g) rear suspension means extending forwardly but not rearwardly of the rear axle for smoothing out the ride of the sweeper, wherein the suspension means comprises connecting arm means extending between the rear axle and a location forwardly of the rear axle, wherein the connecting arm means is rigidly connected to the rear axle and pivotally connected to the frame beams forwardly of the rear axle, and bias means mounted directly below the frame beams and directly above the rear axle for biasing the rear axle away from the chassis.

10. A sweeper as defined in claim 9, wherein the bias means comprises a rubber pad which acts as a spring and shock absorber.

11. A sweeper as defined in claim 9, wherein the connecting arm means functions as a trailing arm and torsion bar.

* * * * *